(12) United States Patent
Bandel et al.

(10) Patent No.: US 12,417,207 B2
(45) Date of Patent: Sep. 16, 2025

(54) FILE SYSTEM MIGRATION MAPPING

(71) Applicant: CDW LLC, Vernon Hills, IL (US)

(72) Inventors: Ryan Andrew Bandel, Artesia, CA (US); Samuel Mashburn, Knoxville, TN (US); Thomas W. Dietz, Grand Rapids, MI (US)

(73) Assignee: CDW LLC, Vernon Hills, IL (US)

( * ) Notice: Subject to any disclaimer, the term of this patent is extended or adjusted under 35 U.S.C. 154(b) by 215 days.

(21) Appl. No.: 18/235,737

(22) Filed: Aug. 18, 2023

(65) Prior Publication Data

US 2025/0061084 A1 Feb. 20, 2025

(51) Int. Cl.
*G06F 16/182* (2019.01)
*G06F 16/11* (2019.01)
*G06F 21/62* (2013.01)

(52) U.S. Cl.
CPC .......... *G06F 16/119* (2019.01); *G06F 16/182* (2019.01); *G06F 21/6218* (2013.01)

(58) Field of Classification Search
CPC ... G06F 16/119; G06F 16/182; G06F 21/6218
See application file for complete search history.

(56) References Cited

U.S. PATENT DOCUMENTS

| 9,110,988 B1 * | 8/2015 | Tan .................. G06F 16/783 |
| 2016/0132935 A1 * | 5/2016 | Shen .................. G06Q 30/0269 |
| | | 705/14.66 |
| 2019/0028355 A1 | 1/2019 | Subramanian et al. |
| 2021/0165759 A1 | 6/2021 | Bar-Nissan et al. |
| 2024/0193282 A1 * | 6/2024 | Townsend ............. G06F 16/182 |

OTHER PUBLICATIONS

International Search Report and Written Opinion for International Application No. PCT/US2024/042277, mailed Nov. 29, 2024.
JamSoftware "TreeSize—Overview and Tidy up your Storage" Web page downloaded from the Internet at <https://www.jam-software.com/treesize>. Retrieved from the Internet on Nov. 17, 2023.
ShareGate "Migration tool—Microsoft 365 migration without the mess. We got this" Web page downloaded from the Internet at <https://sharegate.com/microsoft-migration>. Retrieved from the Internet on Nov. 17, 2023.
AvePoint, "Pre-Migration Discovery Tool for SharePoint & Microsoft 365" Web page downloaded from the Internet at <https://www.avepoint.com/products/hybrid/discovery-tool>. Retrieved from the Internet on Nov. 17, 2023.

(Continued)

*Primary Examiner* — Viet D Vu
(74) *Attorney, Agent, or Firm* — MARSHALL, GERSTEIN & BORUN LLP; Randall G. Rueth

(57) ABSTRACT

A computing system and method for mapping a migration to a new distributed file system is provided. A method may include receiving file system metadata from an existing distributed file system, comparing permissions for each file and each user, generating a plurality of recommended groups, recommended folders, and recommended permissions, and presenting the recommended groups, recommended folders, and recommended permissions to a user.

24 Claims, 13 Drawing Sheets

(56) References Cited

OTHER PUBLICATIONS

AvePoint, "Accelerate Digital Transformation with Office 365 migration" Web page downloaded from the Internet at <https://www.avepoint.com/products/hybrid/office-365-migration>. Retrieved from the Internet on Nov. 17, 2023.

Quest, "On Demand Migration" Web page downloaded from the Internet at <https://www.quest.com/products/on-demand-migration/>. Retrieved from the Internet on Nov. 17, 2023.

* cited by examiner

| Username | Full Name | Title | Last Login |
|---|---|---|---|
| atrask | Amy Trask | Paralegal | 7/24/2023 |
| atyler | Adam Tyler | Accountant | 7/23/2023 |
| ayoung | Allison Young | Manager | 7/23/2023 |
| cjordan | Cameron Jordan | Inside Sales | 7/23/2023 |
| cwallace | Carrie Wallace | Manager | 7/24/2023 |
| jadams | Jennifer Adams | Accountant | 7/24/2023 |
| jsmith | John Smith | Counsel | 7/24/2023 |
| jwinston | Jessica Winston | Vice President | 7/24/2023 |
| mharris | Mark Harris | Payroll Coordinator | 7/24/2023 |
| mjohnson | Melissa Johnson | Payroll Coordinator | 7/24/2023 |
| mjones | Mary Jones | Manager | 7/23/2023 |
| pcarroll | Patrick Carroll | Accountant | 4/3/2023 |
| rphillips | Robert Phillips | President | 7/23/2023 |
| schen | Steve Chen | Engineer | 7/24/2023 |
| tdavis | Thomas Davis | Accountant | 7/24/2023 |
| thollis | Theresa Hollis | General Counsel | 7/24/2023 |
| tquincy | Thomas Quincy | Payroll Coordinator | 7/24/2023 |

FIG. 3A

| Drive Letter | Share Name | Description |
|---|---|---|
| E:\ | Accounting | Accounting shared drive |
| F:\ | Benefits | Benefits shared drive |
| G:\ | Contracts | Contracts shared drive |
| H:\ | Payroll | Payroll shared drive |
| I:\ | Product Data | Product Data shared drive |
| J:\ | Customer Data | Customer Data shared drive |

Payroll Shared Drive

| Filename | File Type | File Size | Date Modified |
|---|---|---|---|
| Chicago payroll 3-2023.xlsx | Excel worksheet | 320 KB | 3/24/2023 |
| Chicago payroll 4-2023.xlsx | Excel worksheet | 320 KB | 4/24/2023 |
| Chicago payroll 5-2023.xlsx | Excel worksheet | 320 KB | 5/24/2023 |
| Chicago payroll 6-2023.xlsx | Excel worksheet | 320 KB | 6/24/2023 |
| Chicago payroll 7-2023.xlsx | Excel worksheet | 320 KB | 7/24/2023 |
| Los Angeles payroll 3-2023.xlsx | Excel worksheet | 155 KB | 3/24/2023 |
| Los Angeles payroll 4-2023.xlsx | Excel worksheet | 155 KB | 4/24/2023 |
| Los Angeles payroll 5-2023.xlsx | Excel worksheet | 155 KB | 5/24/2023 |
| Los Angeles payroll 6-2023.xlsx | Excel worksheet | 155 KB | 6/24/2023 |
| Los Angeles payroll 7-2023.xlsx | Excel worksheet | 155 KB | 7/24/2023 |
| New York payroll 3-2023.xlsx | Excel worksheet | 231 KB | 3/24/2023 |
| New York payroll 4-2023.xlsx | Excel worksheet | 231 KB | 4/24/2023 |
| New York payroll 5-2023.xlsx | Excel worksheet | 231 KB | 5/24/2023 |
| New York payroll 6-2023.xlsx | Excel worksheet | 231 KB | 6/24/2023 |
| New York payroll 7-2023.xlsx | Excel worksheet | 231 KB | 7/24/2023 |

Payroll Shared Drive

| Username/Group Name | Full Control | Change | Read |
|---|---|---|---|
| Everyone | No | No | Yes |
| cwallace | Yes | Yes | Yes |
| mharris | No | Yes | Yes |
| mjohnson | No | Yes | Yes |
| tquincy | No | Yes | Yes |

Payroll Shared Drive

| Date | Username | Access | Filename |
|---|---|---|---|
| Jul 23 14:28:22 2023 | tquincy | Read | C:\Acme\Payroll\Chicago payroll 3-2023.XLSX |
| Jul 23 14:28:22 2023 | tquincy | Read | C:\Acme\Payroll\Chicago payroll 4-2023.XLSX |
| Jul 23 14:28:22 2023 | tquincy | Read | C:\Acme\Payroll\Chicago payroll 5-2023.XLSX |
| Jul 23 14:28:22 2023 | tquincy | Read | C:\Acme\Payroll\Chicago payroll 6-2023.XLSX |
| Jul 23 14:26:57 2023 | tquincy | Read | C:\Acme\Payroll\Chicago payroll 7-2023.xlsx |
| Jul 23 14:26:09 2023 | mjohnson | Write | C:\Acme\Payroll\Los Angeles payroll 7-2023.xlsx |
| Jul 23 14:26:09 2023 | mjohnson | Read | C:\Acme\Payroll\Los Angeles payroll 6-2023.xlsx |
| Jul 23 14:23:44 2023 | mharris | Read | C:\Acme\Payroll\New York payroll 7-2023.xlsx |
| Jul 23 14:21:49 2023 | cwallace | Write | C:\Acme\Payroll\Los Angeles payroll 7-2023.xlsx |
| Jul 23 14:21:49 2023 | cwallace | Read | C:\Acme\Payroll\Chicago payroll 6-2023.XLSX |
| Jul 23 14:21:49 2023 | cwallace | Read | C:\Acme\Payroll\Chicago payroll 5-2023.XLSX |
| Jul 23 14:21:49 2023 | cwallace | Write | C:\Acme\Payroll\New York payroll 7-2023.xlsx |
| Jul 23 14:20:38 2023 | cwallace | Write | C:\Acme\Payroll\New York payroll 7-2023.xlsx |
| Jul 23 14:20:38 2023 | cwallace | Write | C:\Acme\Payroll\Los Angeles payroll 7-2023.xlsx |
| Jul 23 14:20:38 2023 | cwallace | Read | C:\Acme\Payroll\Chicago payroll 6-2023.XLSX |
| Jul 23 14:20:38 2023 | cwallace | Read | C:\Acme\Payroll\Chicago payroll 5-2023.XLSX |
| Jul 23 14:20:38 2023 | cwallace | Write | C:\Acme\Payroll\Chicago payroll 7-2023.xlsx |

Welcome, Thomas Quincy (tquincy). Here is your migration information:

502 — You will be a member of the following groups:
- Employees
  + Human Resources
    - HR Chicago 504 — You will have access to the following folders and files:
+ General
+ Payroll Chicago
    - Chicago payroll 3-2023.xlsx
    - Chicago payroll 4-2023.xlsx
      * * *

506 — You will no longer have access to the following folders and files:
+ Payroll Los Angeles
    - Log Angeles payroll 3-2023.xlsx
    - Los Angeles payroll 4-2023.xlsx
      * * *
+ Payroll New York
    - New York payroll 3-2023.xlsx
    - New York payroll 4-2023.xlsx
      * * *

508 — [Search] [Find My File]

510 — Comments?

Welcome, Administrator (admin). Here are the file and folder recommendations:

532

Recommended Folders and Files
+ Accounting      (E:\)
+ Benefits        (F:\)
+ Contracts       (G:\)
+ Customer Data   (J:\)
+ General         (New)
+ Payroll         (H:\)
    + Chicago     (New)
        - Chicago payroll 3-2023.xlsx
        - Chicago payroll 4-2023.xlsx
        * * *
    + Los Angeles (New)
    + New York    (New)
+ Product Data    (I:\)

[Edit]  [Save]

534

Deleted Folders and Files
• New York payroll 8-2019.xlsx (No activity in 3 years)

[Edit]  [Save]

536

[🔍 Search]  [Find Folder or Files]

FIG. 5C

Welcome, Administrator (admin). Here are the permission recommendations:

542 — Group Tree
- + Accounting
  - − Accounting
- + Employees
  - − General
- + Engineering
  - − Product Data
- + Executives
- + Human Resources
  - − Benefits
  - + HR Chicago
    - − Payroll\Chicago
  - + HR Los Angeles
    - − Payroll\Los Angeles
  - + HR New York
    - − Payroll\New York
- + Legal
  - − Contracts
- + Management
- + Sales
  - − Customer Data

[Edit]  [Save]

544 — Folder Tree
- + Accounting
  - − Accounting
- + Benefits
  - − Human Resources
- + Contracts
  - − Legal
- + Customer Data
  - − Sales
- + General
  - − Employees
- + Payroll
  - + Chicago
    - − HR Chicago
  - + Los Angeles
    - − HR Los Angeles
  - + New York
    - − HR New York
- + Product Data
  - − Engineering

[Edit]  [Save]

FIG. 5D

FILE SYSTEM MIGRATION MAPPING

TECHNICAL FIELD

The present disclosure is directed to improvements related to mapping an existing distributed file system to a new distributed file system, including users, files, and permissions.

BACKGROUND

A distributed file system (DFS) is a file system that allows one or more client devices to access file storage through a network in a manner that resembles accessing local storage. Conventional techniques do not enable organizations to systematically and predictably migrate an existing DFS to a new DFS. The existing DFS may have an outdated or insecure configuration of files, folders, users, groups, or permissions. Conventional techniques rely on best guesses of engineers, administrators, or design consultants regarding migration of the files, folders, users, groups, and permissions from the existing DFS to the new DFS. For an organization having a complex environment, it is not feasible to interview each department and determine which users need what type of access to what files in the new DFS. As such, the organization often migrates to the new DFS in an insecure manner by attempting to replicate the configuration of the existing DFS or granting broad permissions and thus exposes sensitive information to disclosure or tampering.

Accordingly, there is an opportunity for automated tools to analyze the existing DFS and map users, groups, files, folders, and permissions to the new DFS in a time efficient, secure manner.

BRIEF SUMMARY

In one aspect a computer system for mapping a migration to a new file system, the computer system includes one or more processors; and one or more memories having stored thereon computer-executable instructions that, when executed by the one or more processors, cause the computing system to: (i) receive file metadata for a plurality of files, user metadata for a plurality of users, and permissions from an existing DFS, wherein the permissions comprise rules regarding access rights of the plurality of users to the plurality of files; (ii) compare the file metadata for each file to generate file similarity scores, wherein the file similarity scores identify a degree of similarity between compared files; (iii) compare the user metadata for each user to generate user similarity scores, wherein the user similarity scores identify a degree of similarity between compared users; (iv) generate an indication of recommended groups comprising a plurality of users having user similarity scores that exceed a specified threshold; (v) generate an indication of recommended folders comprising a plurality of files having file similarity scores that exceed a specified threshold; (vi) generate an indication of recommended permissions comprising access rights of the recommended groups to the recommended folders; and (vii) transmit to a user device the indication of the recommended groups, the indication of the recommended folders, and the recommended permissions for presentation to a user associated with the user device.

In another aspect, a computer-implemented method of mapping a migration to a new DFS includes (i) receiving, with one or more processors, file metadata for a plurality of files, user metadata for a plurality of users, and permissions from an existing DFS, wherein the permissions comprise rules regarding access rights of the plurality of users to the plurality of files; (ii) comparing, with the one or more processors, the file metadata for each file to generate file similarity scores, wherein the file similarity scores identify a degree of similarity between compared files; (iii) comparing, with the one or more processors, the user metadata for each user to generate user similarity scores, wherein the user similarity scores identify a degree of similarity between compared users; (iv) generating, with the one or more processors, an indication of recommended groups comprising a plurality of users having user similarity scores that exceed a specified threshold; (v) generating, with the one or more processors, an indication of recommended folders comprising a plurality of files having file similarity scores that exceed a specified threshold; (vi) generating, with the one or more processors, an indication of recommended permissions comprising access rights of the recommended groups to the recommended folders; and (vii) transmitting to a user device, with the one or more processors, the indication of the recommended groups, the indication of the recommended folders, and the indication of the recommended permissions for presentation to a user associated with the user device.

In yet another aspect, a computer-readable medium includes computer-executable instructions that, when executed, cause a computer to: (i) receive file metadata for a plurality of files, user metadata for a plurality of users, and permissions from an existing DFS, wherein the permissions comprise rules regarding access rights of the plurality of users to the plurality of files; (ii) compare the file metadata for each file to generate file similarity scores, wherein the file similarity scores identify a degree of similarity between compared files; (iii) compare the user metadata for each user to generate user similarity scores, wherein the user similarity scores identify a degree of similarity between compared users; (iv) generate an indication of recommended groups comprising a plurality of users having user similarity scores that exceed a specified threshold; (v) generate an indication of recommended folders comprising a plurality of files having file similarity scores that exceed a specified threshold; (vi) generate an indication of recommended permissions comprising access rights of the recommended groups to the recommended folders; and (vii) transmit to a user device the indication of the recommended groups, the indication of the recommended folders, and the recommended permissions for presentation to a user associated with the user device.

In addition, the disclosed methods, systems, and computer-readable media include improvements in computer functionality or improvements to other technologies at least because they improve computer security by analyzing permissions in the existing DFS and generating recommended groups, folders, and permissions for the new DFS. That is, security may be improved by using the disclosed methods, systems, and computer-readable media to automate generating recommended groups, folders, and permissions instead of conventional human analysis. Automated generation of recommended groups, folders, and permissions may result in fewer mistakes than and more secure permissions than manual or default generation.

In some aspects, methods, systems, and computer-readable media may include unsupervised or supervised machine learning (ML) techniques for generating recommendations for groups, folders, and permissions in a new DFS. For example, user metadata, file metadata, and log data may be analyzed to classify users into groups and files into folders.

The methods, systems, and computer-readable media thus offer several benefits. In particular, the methods, systems, and computer-readable media use ML techniques to effectively and accurately classify users into groups and files into folders. The methods, systems, and computer-readable media enable users and administrators to review the recommended groups, folders, and permissions and provide feedback or make changes prior to the migration to the new DFS.

The methods, systems, and computer-readable media represent an improvement to an existing technology or technologies, specifically technologies for classifying users into groups and files into folders when migrating from an existing DFS to a new DFS. Technologies do not currently exist for gathering information about users, files, and permissions, processing that information using trained ML models to recommend groups, folders, and permissions, and present the recommended groups, folders, and permissions to users and administrators.

Thus, the present techniques provide new solutions and improve upon existing solutions in multiple ways, benefiting information technology service providers and their customers. These improvements lead to decreased migration effort and better security by enabling organizations to provide their users with access to the files they require without jeopardizing privacy and security by granting overbroad permissions.

The methods, systems, and computer-readable media therefore do not merely recite the performance of some business practice known from the pre-computer world along with the requirement to perform it on a computer. Instead, the methods, systems, and computer-readable media incorporate trained ML models that enable automatic classification of users into groups and files into folders. Thus, the methods, systems, and computer-readable media are necessarily rooted in computer technology to overcome a problem specifically arising in DFS migration.

Additionally, ML models may be trained on a set of recommended groups, folders, and permissions and may receive feedback on its generated recommendations. As such, the ML models may learn and improve their recommendation capabilities over time.

In addition, the present disclosure includes specific features other than what is well-understood, routine, conventional activity in the field, or adding unconventional steps that confine the claim to a particular useful application, e.g., calculating file similarity and user similarity scores to recommend folders and groups, as further described herein.

BRIEF DESCRIPTION OF THE FIGURES

The figures described below depict various aspects of the system and methods disclosed therein. It should be understood that each figure depicts one aspect of a particular aspect of the disclosed systems and methods, and that each of the figures is intended to accord with a possible aspect thereof. Further, wherever possible, the following description refers to the reference numerals included in the following figures, in which features depicted in multiple figures are designated with consistent reference numerals.

FIG. 3A depicts an exemplary user table export from an existing DFS, according to some aspects.

FIG. 3B depicts an exemplary shared drive export from an existing DFS, according to some aspects.

FIG. 3C depicts an exemplary file table export from an existing DFS, according to some aspects.

FIG. 3D depicts an exemplary permissions table export from an existing DFS, according to some aspects.

FIG. 3E depicts an exemplary activity log export from an existing DFS, according to some aspects.

FIG. 5A depicts an exemplary indication of the recommended groups, folders, and permissions in the new DFS for review by a user, according to some aspects.

FIG. 5C depicts an exemplary indication of the recommended files and folders in the new DFS for review by an administrator, according to some aspects.

FIG. 5D depicts an exemplary indication of the recommended permissions in the new DFS for review by an administrator, according to some aspects.

The figures depict preferred aspects for purposes of illustration only. One skilled in the art will readily recognize from the following discussion that alternative aspects of the systems and methods illustrated herein may be employed without departing from the principles of the invention described herein.

DETAILED DESCRIPTION

Overview

The present techniques provide methods and systems for, inter alia, mapping an existing DFS to a new DFS, including users, groups, files, folders, and permissions. For example, the present techniques include aspects directed to scanning one or more customer environments to identify site resources and/or content resources, as well as for generating, by processing the site signals and content signals using one or more trained ML models, to predict migration outputs, and causing the migration prediction outputs to be acted upon (e.g., via displaying the outputs). The present techniques improve upon computing environment migration systems by, inter alia, providing reliable and repeatable techniques for accurately recommending groups, folders, and permissions for the new DFS, without forcing migration engineers (or clients) to hazard subjective guesses regarding the organization of groups, folders, and permissions.

Exemplary Computing Environment

Figure 1:
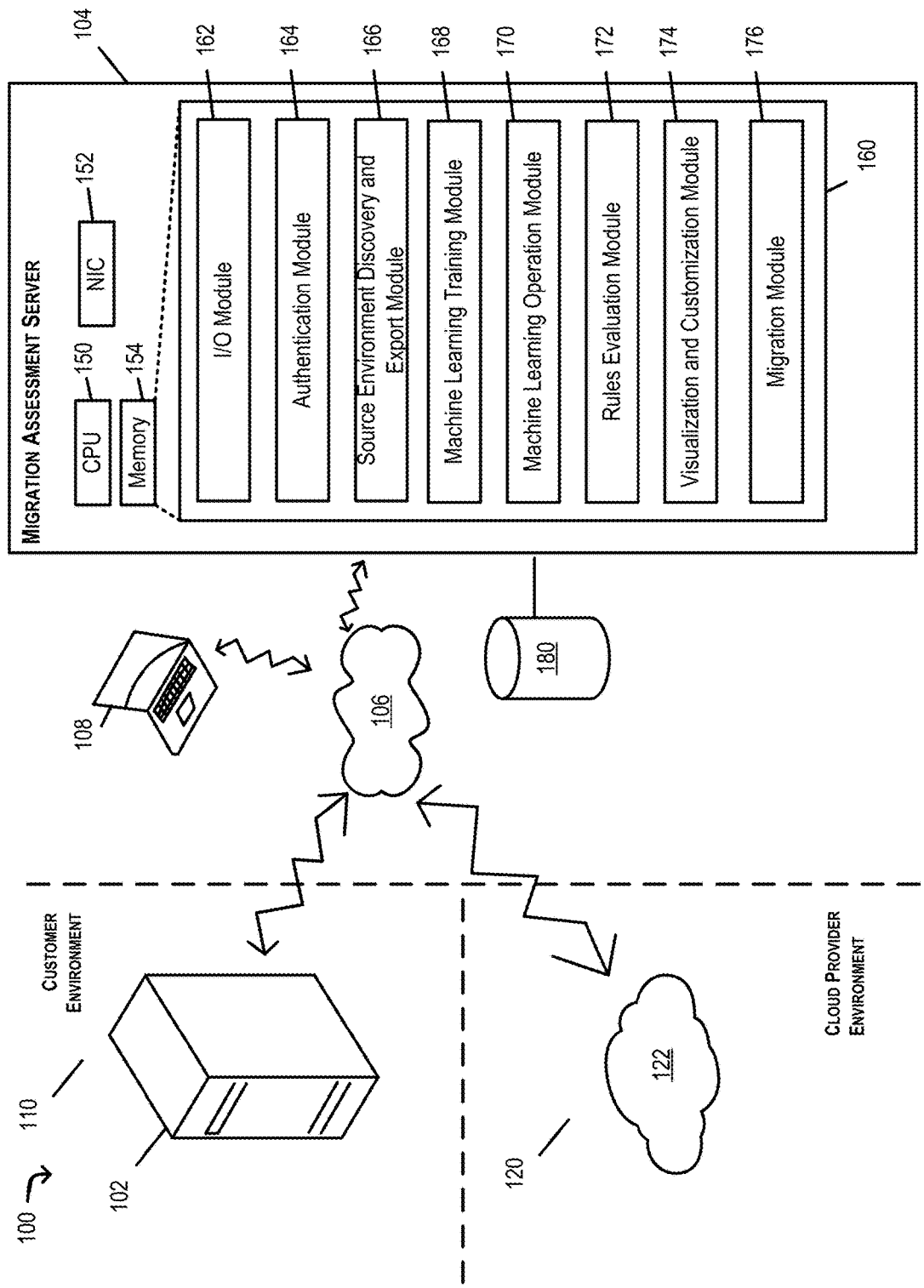
FIG. 1 depicts an exemplary computing environment in which the techniques disclosed herein may be implemented, according to some aspects.

FIG. 1 depicts an exemplary computing environment 100 in which the techniques disclosed herein may be implemented, according to some aspects. The environment 100 may include a customer environment 110 and/or a cloud provider environment 120. The computing environment 100 may include one or more DFS servers 102, a cloud DFS 122, a migration assessment server 104, a network 106, and one or more client devices 108. Some aspects may include a plurality of migration assessment servers 104.

The DFS server 102 may be an individual server, a group (e.g., cluster) of multiple servers, or another suitable type of computing device or system (e.g., a collection of computing resources). The DFS server 102 may be located within an organization's enterprise network or hosted by a third-party provider. For example, the DFS server 102 may be any suitable computing device (e.g., a server). In some aspects, one or more components of the DFS server 102 may be embodied by one or more virtual machines. The DFS server 102 may host Microsoft Windows file shares, one or more Microsoft SharePoint sites, Network File System (NFS) shares, etc.

The cloud DFS 122 may be a managed file system as a service in which the computing environment details are less visible to the organization. The cloud DFS 122 may be included in a cloud provider environment 120, such as a public cloud, a private cloud, hybrid cloud, etc. For example, an information technology (IT) service provider may host one or more services in a public cloud computing environment (e.g., Alibaba Cloud, Amazon Web Services (AWS), Google Cloud, IBM Cloud, Microsoft Azure, etc.). The cloud provider environment 120 can be a traditional off-premises cloud (i.e., not physically hosted at a location owned/controlled by the business). Alternatively, or in addition, aspects of the cloud provider environment 120 can be hosted on-premises at a location owned/controlled by the IT service provider. The cloud can be partitioned using visualization and multi-tenancy techniques and can include one or more infrastructure-as-a-service (IaaS) and/or platform-as-a-service (PaaS) services. The cloud DFS 122 may be hosted on one or more physical or virtual servers. The cloud DFS 122 may comprise Google Drive, Google Workspace, Microsoft OneDrive, Microsoft SharePoint, Microsoft Teams, etc.

The network 106 may be a single communication network or may include multiple communication networks of one or more types (e.g., one or more wired and/or wireless local area networks (LANs), and/or one or more wired and/or wireless wide area networks (WANs) such as the Internet). The network 106 may enable bidirectional communication between the DFS server 102 and the migration assessment server 104, the cloud DFS 122 and the migration assessment server 104, and/or between other computing devices/instances, for example.

The DFS server 102 includes a processor and a network interface controller (NIC). The processor may include any suitable number of processors and/or processor types, such as CPUs and one or more graphics processing units (GPUs). Generally, the processor is configured to execute software instructions stored in a memory. The memory may include one or more persistent memories (e.g., a hard drive/solid state memory) and stores one or more set of computer executable instructions/modules.

The DFS server 102 includes a respective input device and a respective output device. The respective input devices may include any suitable device or devices for receiving input, such as one or more microphones, one or more cameras, a hardware keyboard, a hardware mouse, a capacitive touch screen, etc. The respective output devices may include any suitable device for conveying output, such as a hardware speaker, a computer monitor, a touch screen, etc. In some cases, the input device and the output device may be integrated into a single device, such as a touch screen device that accepts user input and displays output. The DFS server 102 may be associated with (e.g., owned/operated by) a company that services enterprise customers, and may include software licensed from a third party. For example, the DFS server 102 may be one of several servers owned/leased by the company, each comprising a hosted Microsoft SharePoint site that services yet further customers.

The NIC of the DFS server 102 may include any suitable network interface controller(s), such as wired/wireless controllers (e.g., Ethernet controllers), and facilitate bidirectional/multiplexed networking over the network between DFS server 102 and other components of the environment 100 (e.g., another server (not depicted), the migration assessment server 104, an electronic database, etc.).

The DFS server 102 may include specific access controls that allow authenticated users (e.g., users or scripts of the migration assessment server 104) to access the DFS server 102. For example, the DFS server 102 may include instructions that allows authentication and querying of a SharePoint site. The DFS server 102 may include instructions that enable authentication and querying of an email server. These respective sets of instructions may be diverse, for example, one may be enabled by a closed-source software library, while the other may be enabled by a Free/Open Source software library. The configuration of APIs and access control is discussed further below from the perspective of the migration assessment server 104.

The migration assessment server 104 includes a processor 150, a network interface controller (NIC) 152, and a memory 154. The migration assessment server 104 may further include a database 180. The database 180 may be a structured query language (SQL) database (e.g., a MySQL database, an Oracle database, etc.) or another type of database (e.g., a not only SQL (NoSQL) database). The migration assessment server 104 may include a library of client bindings for accessing the database 180. In some aspects, the database 180 is located remote from the migration assessment server 104. For example, the database 180 may be implemented using a RESTdb.IO database, an Amazon Relational Database Service (RDS), etc. in some aspects. In some aspects, the migration assessment server 104 may include a client-server platform technology such as Python, PHP, ASP.NET, Java J2EE, Ruby on Rails, Node.js, a web service or online API, responsive for receiving and responding to electronic requests.

The processor 150 may include any suitable number of processors and/or processor types, such as CPUs and one or more graphics processing units (GPUs). Generally, the processor 150 is configured to execute software instructions stored in the memory 154. The memory 154 may include one or more persistent memories (e.g., a hard drive/solid state memory) and stores one or more sets of computer executable instructions/modules 160.

In general, a computer program or computer-based product, application, or code (e.g., the model(s), such as machine learning models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 150 (e.g., working in connection with the respective operating system in memory 154) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

Exemplary Computing Modules

The migration assessment server 104 may comprise one or more modules 160, including an input/output (I/O) module 162, an authentication module 164, a source environment discovery and export module 166, a machine learning training module 168, a ML operation module 170, a rules evaluation module 172, a visualization and customization module 174, and a migration module 176. Each of the modules 160 implements specific functionality related to the present techniques, as will be described further, below. In some aspects, a plurality of the modules 160 may implement a particular technique. For example, functionality provided by instructions within the authentication module 164 may be used by the source environment discovery and export module 166, to enable the migration assessment server 104 to access the customer environment 110 or cloud provider environment 120. Thus, the modules 160 may exchange data via suitable techniques, e.g., via inter-process communication (IPC), a Representational State Transfer (REST) API, etc. within a single computing device, such as the migration assessment server 104. Or, in aspects wherein the migration assessment server 104 is implemented using multiple servers, a first server may include the authentication module 164 while a second server may include the source environment discovery and export module 166, for example. In some aspects, a plurality of the modules 160 may be implemented in a plurality of computing devices (e.g., a plurality of servers 104). The modules 160 may exchange data among the plurality of computing devices via a network such as the network 106. The modules 160 of FIG. 1 will now be described in greater detail.

Generally, the I/O module 162 includes instructions that enable an administrator to access and operate the migration assessment server 104 (e.g., via the client computing device 108). For example, the administrator may be a consultant, a migration engineer, etc. Once the one or more ML models are trained, the same administrator may access the migration assessment server 104 via the I/O module 162 to cause the migration assessment process to be initiated. The I/O module 162 may include instructions for generating one or more graphical user interfaces (GUIs) that collect and store parameters related to the migration assessment project, such as a migration project name (e.g., Example Migration), a migration project domain name/internet protocol (IP) address (e.g., http://exampleprodev.onmicrosoft.com), a portal uniform resource locator (URL) (e.g., http://example-portal.sharepoint.com), a root site URL (e.g., http://example.sharepoint.com), an administrator URL (e.g., http://example-admin.sharepoint.com), one or more site URLs (e.g., http://example-site.sharepoint.com), a default location toggle, etc.

The I/O module 162 may also include GUI features that enable the user to initiate a scanning process, after one or more migration assessment project parameters are collected and stored. For example, the I/O module 162 may include instructions for receiving a user selection of the project Example Migration project and its related parameters, and to initiate a scan of the one or more domain names, one or more IP addresses and/or one or more URLs associated with the Example Migration project. The I/O module 162 may communicate a start scan instruction to the scanner modules, discussed below. The I/O module 162 may include a library of functions that enable the user to perform "pre-flight" operations with respect to one or more services/resources associated with the migration project. For example, it may be highly desirable prior to performing a migration to cause a backup to occur, and/or to place a service/resource into a read-only mode. The pre-flight instruction sets of the I/O module may include instructions enable the user to selectively backup and/or make read-only certain resources/services associated with the project, including those that are discovered by the scanning process described below. The I/O module 162 may include a communication component configured to communicate (e.g., send and receive) data via one or more external/network port(s) to one or more networks or local terminals, such as client device 108 (for rendering or visualizing) described herein.

The authentication module 164 may include instructions for authenticating via one or more authentication methods to the DFS server 102 or the cloud DFS 122. For example, the authentication module 164 may include software client libraries for accessing the customer's own Identity Provider (IdP). The authentication module 164 may store one or more cookie or persistent sessions (e.g., a Federation Authentication (FedAuth) cookie) in association with each project (e.g., the Example Project discussed above). The authentication module 164 may also store and/or access (e.g., via the electronic database 180) one or more certificates for accessing certificate-based authentication resources/services (e.g., public key cryptography, Secure Shell (SSH)) services, Secure Sockets Layer services, etc.). Generally, the authentication module 164 may include a software library for authenticating via any suitable authentication mechanism, using stored credentials. In some aspects (e.g., multi-factor authentication aspects), the authentication module 164 may receive one-use passwords from an administrator (e.g., via the I/O module 162).

The source environment discovery and export module 166 may include instructions for exporting existing DFS metadata. The source environment discovery and export module 166 may be a commercially-available software package, e.g., ShareGate or AvePoint, or a proprietary program. The source environment discovery and export module 166 may access and export user data. The source environment discovery and export module 166 may access and export group data, which may include group names, descriptions, child and/or parent groups, and group members. The source environment discovery and export module 166 may access and export file data. The source environment discovery and export module 166 may access and export folder data, which may include folder names, child and/or parent folders, sharing status, and list of filenames within the folders, and list of files contained within the folders. The source environment discovery and export module 166 may access and export permissions. The DFS metadata may be exported in comma-separated values (CSV), extensible markup language (XML), JavaScript Object Notation (JSON), or any other format. The DFS metadata may be imported into the database 180.

The source environment discovery and export module 166 may include instructions for exporting DFS log data. The DFS log data may include a list of access events over a period of time. The DFS log data may be exported in CSV, XML, JSON, or any other format. The DFS log data may be imported into the database 180.

The rules evaluation module 172 may evaluate predicted folders, groups, and permissions against a rule set. The rule set may a file in a standardized format or may be a set of rules input by the administrator. For example, the rules evaluation module 172 may evaluate the output of the ML operation module 170 using the rule set to determine whether the predictions make sense in a security context. For example, the rules evaluation module 172 may include computer-executable instructions, that when executed, cause the migration assessment server 104 to evaluate whether a predicted permission violates the customer's security policy. The rules evaluation module 172 may detect stale files or user accounts that have not been accessed in a specified time period. The rules evaluation module 172 may communicate one or more potential violations to the administrator via the visualization and customization module 174, a web browser running on client computing device 108, an e-mail, or other communication method.

The visualization and customization module 174 may include instructions for processing data stored in the schemas and for generating one or more visual representations of that data, in the form of static images (e.g., graphs, charts, diagrams, etc.) and/or animated or video-based outputs. The visualization module and customization module 174 may retrieve the predicted groups, folders, and permissions from the database 180. The visualization and customization module 174 may allow the customer's users to preview the prediction of the groups, folders, and permissions and provide feedback. The visualization and customization module 174 may allow the administrator to modify the predicted groups, folders, and permissions to create finalized groups, folders, and permissions.

The migration module 176 may implement the finalized groups, folders, and permissions in the new DFS. The migration module 176 may be a commercially-available software package, e.g., ShareGate, Quest On Demand Migration, or AvePoint, or a proprietary program. The new DFS may be a staging, test, or production environment. The new DFS may be located in the customer environment 110 or cloud provider environment 120. The migration module 176 may utilize the authentication module 164 to authenticate to the new DFS. The migration module 176 may use an API to remotely create the finalized groups, folders, and permissions in the new DFS. The migration module 176 may copy files from the existing DFS into the new DFS. The migration module 176 may generate a script or an executable that creates the finalized groups, folders, and permissions when run on the new DFS. The migration module 176 may generate a configuration file in CSV, XML, JSON, or any other format that includes the finalized groups, folders, and permissions. An application, script, or other program may generate the finalized groups, folders, and permissions in the new DFS using the configuration file as input.

In a successful migration, the migration module 176 successfully creates the finalized groups, folders, and permissions specified in the configuration file in the new DFS. The successful migration may also include copying all of the specified files from the existing DFS into specified location in the new DFS. In an unsuccessful migration, the migration module 176 or new DFS may output one or more errors for the administrator to review. The administrator may resolve the errors through input to the visualization and customization module 174 and generation of a new configuration file. The administrator may resolve the errors through manually editing the configuration file or manually creating one or more users, groups, folders, or permissions in the new DFS.

In operation, the administrator accesses the migration assessment server 104. For example, the administrator may use the client computing device 108, or the server 104 directly via peripheral devices (not depicted in FIG. 1). The administrator accesses the server 104 via the I/O module 162 and initiates a migration project, as discussed above. The administrator may initiate a scanning process via the source environment discovery and export module 166 to collect DFS information from the customer environment 110 or the cloud provider environment 120. The administrator may provide details about the new DFS. The user may further specify whether the assessment is to be an assessment only (i.e., dry run).

Exemplary Machine Learning Model Training and Model Operation Modules

Machine learning may involve identifying and recognizing patterns in existing data (such as similarities, sensitive data, etc.) in order to facilitate making predictions, classifications, and/or identifications for subsequent data (such as using the models to determine or generate a classification or prediction for groups, folders, and permissions for a new DFS). Machine learning model(s), may be created and trained based upon example data (e.g., training data) inputs or data (which may be termed features and labels) in order to make valid and reliable predictions for new inputs, such as testing level or production level data or inputs.

In supervised machine learning, a machine learning program operating on a server, computing device, or other processor(s) may be provided with example inputs (e.g., features) and their associated, or observed, outputs (e.g., labels) in order for the machine learning program or algorithm to determine or discover rules, relationships, patterns, or otherwise machine learning models that map such inputs (e.g., features) to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

In unsupervised machine learning, the server, computing device, or other processor(s) may be required to find its own structure in unlabeled example inputs, where, for example multiple training iterations are executed by the server, computing device, or other processor(s) to train multiple generations of models until a satisfactory model, e.g., a model that provides sufficient prediction accuracy when given test level or production level data or inputs, is generated. Supervised learning and/or unsupervised machine learning may also comprise retraining, relearning, or otherwise updating models with new, or different, information, which may include information received, ingested, generated, or otherwise used over time. The present techniques may use one or both of such supervised or unsupervised machine learning techniques. In various aspects, training the ML models herein may include generating an ensemble model comprising multiple models or sub-models, comprising models trained by the same and/or different AI algorithms, as described herein, and that are configured to operate together.

The ML training module 168 may include a set of computer-executable instructions implementing machine learning training, configuration, parameterization and/or storage functionality. In some aspects, the present techniques may include using a machine learning framework (e.g., Keras, scikit-learn, etc.) to facilitate the training and/or operation of machine learning models. The ML training module 168 may initialize, train and/or store one or more ML models, as discussed herein. The trained ML models may be stored in the database 180, which is accessible or otherwise communicatively coupled to the migration assessment server 104.

One or more training data sets may be used for model training in the present techniques, as discussed herein. The elements of the training data set may comprise tensors scaled to small values (e.g., in the range of (−1.0, 1.0)). In some aspects, a preprocessing layer may be included in training (and operation) which applies principal component analysis (PCA) or another technique to the input data. PCA or another dimensionality reduction technique may be applied during training to reduce dimensionality from a high number to a relatively smaller number. Reducing dimensionality may result in a substantial reduction in computational resources (e.g., memory and CPU cycles) required to train and/or analyze the input data.

Training data may be divided into training, validation, and testing data. For example, 20% of the training data set may be held back for later validation and/or testing. In that example, 80% of the training data set may be used for training. In that example, the training data set data may be shuffled before being so divided. Data input to the ML model may be encoded in an N-dimensional tensor, array, matrix, and/or other suitable data structure.

The training data may be, for example, historical data related to migrations previously performed by the customer or anonymized historical data related to migrations previously performed by other customers. The historical data may include labels that indicate, for a given migration, a mapping of users, groups, files, folders, and/or permissions to signals (e.g., labeled historical migration log files that include signal data, wherein the labels correspond to groups, folders, and permissions). The mapping may be generated by analyzing log files generated during prior migrations. The historical data may be unlabeled. Initially, weights of the ML models may be initialized to random values, and one or more suitable activation functions may be chosen for the training process, as will be appreciated by those of ordinary skill in the art. One or more ML models may be trained to predict appropriate groups, group memberships, folders, folder memberships, and/or permissions based on signals, and the ML training module 168 may include training a respective output layer of the one or more machine learning models. The output layer may be trained to output a prediction, for example.

Once the ML training module 168 has initialized the one or more ML models, which may be classification or clustering models, for example, the ML training module 168 trains the ML models by inputting training data into the models. In various aspects, an ML model, as described herein, may be trained using a supervised or unsupervised machine learning program or algorithm. The ML training module 168 may serialize the trained model and store the trained model in a database (e.g., the database 180). Of course, it will be appreciated by those of ordinary skill in the art that the ML training module 168 may train and store more than one model. For example, the ML training module 168 may train an individual model for each site type.

In some aspects, the computing modules 160 may include an ML operation module 170, comprising a set of computer-executable instructions implementing machine learning loading, configuration, initialization and/or operation functionality. The ML operation module 170 may include instructions for storing trained models (e.g., in the electronic database 180, as a pickled binary, etc.). Once trained, an ML model may be operated in inference mode, whereupon when provided with de novo input that the model has not previously been provided, the model may output one or more predictions, classifications, etc. as described herein. In an unsupervised learning aspect, a loss minimization function may be used, for example, to teach an ML model to generate output that resembles known output (i.e., ground truth exemplars).

Once the model(s) are trained by the ML training module 168, the ML operation module 170 may load one or more trained models (e.g., from the database 180). The ML operation module 170 applies new data that the trained model has not previously analyzed to the trained model. For example, the ML operation module 170 may load a serialized model, deserialize the model, and load the model into memory. The ML operation module 170 may load new migration data that was not used to train the trained model. For example, the new customer data may include signals data stored by the source environment discovery and export module 166, as described above, encoded as input tensors. The ML operation module 170 may apply the one or more input tensor(s) to the trained ML model. The ML operation module 170 may receive output (e.g., tensors, feature maps, etc.) from the trained ML model. The output of the ML model may be a prediction of the groups, folders, and permissions associated with migrating the resources/content. The ML operation module 170 may save the output from the trained ML model into the database 180. In this way, the present techniques advantageously provide a means for the customer to preview the organization of the new DFS before deployment.

The architecture of the ML training module 168 and the ML operation module 170 as separate modules represent advantageous improvements over the prior art. In conventional computing systems that include multiple machine learning algorithms, for performing various functions, the models are often added to each individual module or set of instructions independent from other algorithms/modules. This is wasteful of storage resources, resulting in significant code duplication. Further, repeating ML model storage in this way may result in redundant retraining of the same model aspects, wasting computational resources. By consolidating ML model training and ML model operation into two respective modules that may be reused by any of the various ML algorithms/modeling suites of the present techniques, waste of storage and computation is avoided. Further, this organization enables computational training work to be organized by a task scheduling module (not depicted), for efficiently allocating computing resources for training and operation, to avoid overloading the underlying system hardware, and to enable training to be performed using distributed computing resources (e.g., via the network 106) and/or using parallel computing strategies.

Exemplary Existing Distributed File System

Figure 2:
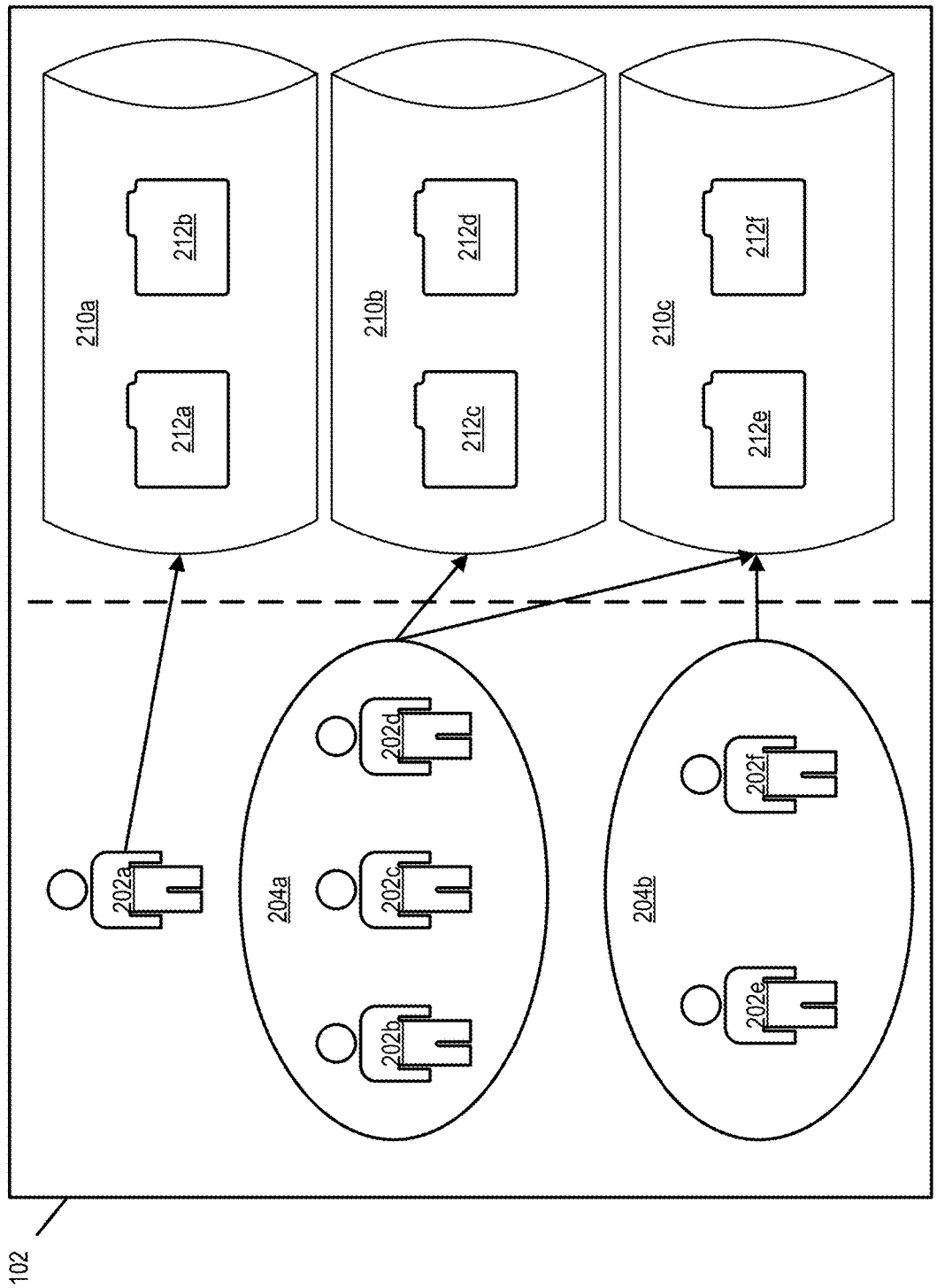
FIG. 2 depicts an exemplary existing DFS, according to some aspects.

FIG. 2 depicts an exemplary file system in which the techniques disclosed herein may be implemented, according to some aspects. The exemplary DFS may comprise one or more DFS servers 102. The DFS server 102 may be a member of a Microsoft Windows domain or workgroup. The DFS server 102 may be a domain controller. The DFS server 102 may be a NFS server utilizing Kerberos for authentication. The DFS server 102 may be a Mac server utilizing SMBX.

The DFS server 102 may comprise one or more users 202. The DFS server 102 may comprise one or more groups 204. Users 202 may or may not be a member of a group 204. As illustrated, user 202a is not a group member, users 202b, 202c, and 202d are members of group 204a, and users 202e and 202f are members of group 204b.

The DFS server 102 may comprise one or more shared drives 210. The shared drives may comprise one or more files 212. As illustrated, shared drive 210a comprises files 212a and 212b, shared drive 210b comprises files 212c and 212d, and shared drive 210c comprises files 212e and 212f.

The DFS server 102 may comprise one or more permissions, illustrated by arrows. Permissions may grant a subject, e.g., a user 202 or group 204, a specified level of access, e.g., read, change, or full control, to an object, e.g., a shared drive 210 or file 212. As illustrated, user 202a has permission to access shared drive 210*a*, group 204*a* has permission to access shared drives 210*b* and 210*c*, and group 204*b* has permission to access shared drive 210*c*.

Exemplary Distributed File System Metadata and Log Data

FIGS. 3A-3D depicts exemplary DFS metadata, according to some aspects. The DFS metadata may be exported from the DFS server 102 by the source environment discovery and export module 166.

FIG. 3A depicts an exemplary user table 310. The user table 310 may comprise information about each user who has access to the DFS server 102. The user information may include usernames, full names, job titles, departments, telephone numbers, office locations, e-mail addresses, organization membership, group membership, account creation date, or last login date. As illustrated, user entry 312 has a username of "pcarroll," a full name of "Patrick Carroll," a title of "Accountant," and a last login of "4/3/2023." Because Patrick Carroll has not logged in the last three months, he may no longer work at the organization; thus, the rules evaluation module 172 may flag this user and notify the administrator about a potential security risk.

FIG. 3B depicts an exemplary shared drive table 320. The shared drive table may comprise information about shared drives or shared folders on the DFS server 102. The shared drive information may include drive letter, share name, local file path, or a text description of the share.

FIG. 3C depicts an exemplary file table 330 for the payroll shared drive. The file table 330 may comprise information about files within a shared drive on the DFS server 102. The file information may include filenames, file types, creation date, last access date, last modification date, parent folder, file size, or file contents. As illustrated, the payroll shared drive includes spreadsheets generated each month for the Chicago, Los Angeles, and New York offices. The rules evaluation module 172 may look for files having a last access date older than a specified date and notify the administrator about a potential document retention policy violation.

FIG. 3D depicts an exemplary permissions table 340 for the payroll shared drive. The permissions table may comprise information about which groups or users have which level of access to which shared drives, folders, or files. The permissions information may include rules for what level of access, e.g., full control, change, or read, groups or users may have. As illustrated, the Everyone group has Read access to the payroll shared drive; the rules evaluation module 172 may flag this permission and notify an administrator. The user cwallace, a Manager, has Full Control for the shared drive. The users mharris, mjohnson, and tquincy, who are Payroll Coordinators, have Change and Read access to the shared drive.

FIG. 3E depicts exemplary DFS log data 350 for the payroll shared drive, according to some aspects. The DFS log data 350 may be exported from the DFS server 102 by the source environment discovery and export module 166. The DFS log data 350 may be generated by enabling auditing of the shared drive on the DFS server 102 and gathering the event logs. The DFS log data 350 may be generated by a third party software tool, e.g., NetShareMonitor, or a proprietary tool. The DFS log data 350 may comprise records of file access, including date and time stamps, usernames, filenames, and access event type, e.g., create, delete, read, or write. The DFS log data 350 may be collected over a specified period of time, e.g., 30 days.

The machine learning operation module 170 may use the DFS log data 350 to determine recommended groups, folders, and permissions. As illustrated, the user tquincy has read Chicago payroll spreadsheets, the user mjohnson and read and written Los Angeles payroll spreadsheets, the user mharris has read a New York payroll spreadsheet, and the user cwallace has read and written Chicago, New York, and Los Angeles payroll spreadsheets. Based in part on the DFS log data 350, the machine learning operation module 170 may determine that tquincy does not need access to the Los Angeles and New York payroll spreadsheets, mjohnson does not need access to the Chicago and New York payroll spreadsheets, and mharris does not need access to the Chicago and Los Angeles payroll spreadsheets. Thus, machine learning operation module 170 may recommend dividing the single Payroll shared drive into Chicago, New York, and Los Angeles Payroll folders. The machine learning operation module 170 may recommend creating HR Chicago, HR New York, and HR Los Angeles user groups and granting those groups access to the Chicago, New York, and Los Angeles Payroll folders, respectively.

Exemplary Clustering of Users and Files

Figure 4:
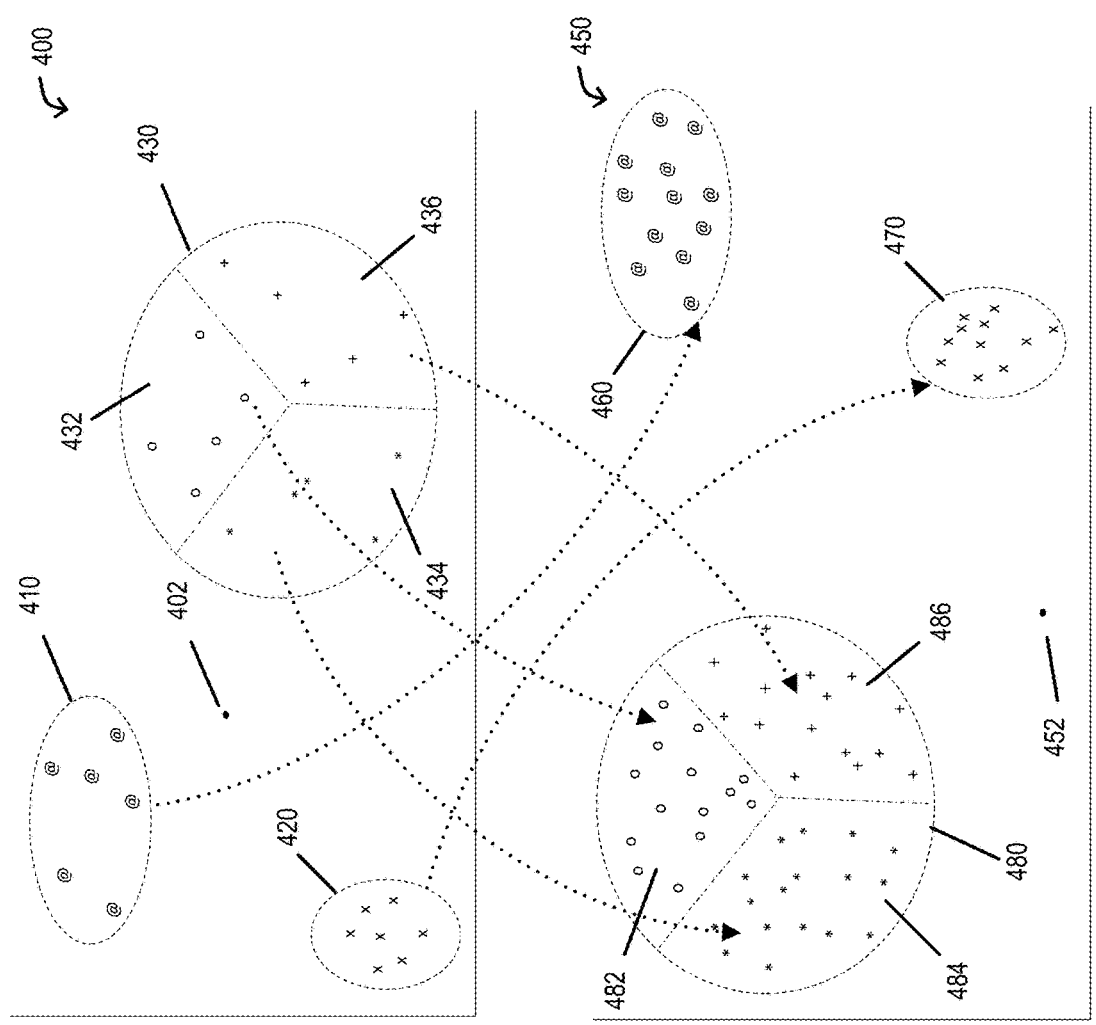
FIG. 4 depicts exemplary clustering graphs for users and files, according to some aspects.

FIG. 4 depicts exemplary clustering of users into groups and clustering of files into folders, according to some aspects. Clustering may be used to group similar users together and group similar files together in the new DFS. Clustering may be performed by the machine learning operation module 170. The machine learning operation module 170 may perform hierarchical, centroid-based, e.g., k-means, distribution-based, density-based, and/or grid-based clustering. Although FIG. 4 depicts clustering graphs having two dimensions (features) for illustration purposes, the data may have three or more features.

Cluster graph 400 depicts clustering of a plurality of users. Each data point on cluster graph 400 may represent an individual user. The location of the users in the cluster graph 400 may depend upon user metadata information from the user table 310, including usernames, full names, job titles, departments, telephone numbers, office locations, e-mail addresses, organization membership, group membership, account creation date, or last login date. The location of the users in the cluster graph 400 may depend upon information from the permissions table 340, including what permissions the users have for which drives, folders, and files. The location of the users in the cluster graph 400 may also depend upon information from the DFS log data 350, including which files the users have accessed, what type of access, etc.

As the machine learning operation module 170 is trained, different weights may be applied to different features of the user data. For example, the existing group membership may be weighted more heavily than the telephone number.

The machine learning operation module 170 may calculate user similarity scores to quantify the similarity of a user to other users. Euclidean distance, cosine distance, or other techniques may be used to measure similarity, i.e., the distance between two users. A plurality of users having user similarity scores above a specified threshold, i.e., a cluster, may be labeled by the machine learning operation module 170 and grouped together into groups, such as recommended groups 410, 420, and 430. A user may be a member of a plurality of recommended groups. A user having insufficient similarity to other users, e.g., user 402, may be an outlier that is not included in a recommended group. Such an outlier user may be flagged and brought to the administrator's attention. Recommended group membership may be based, in whole or in part, by the groups in the existing DFS.

A recommended group, e.g., group 430, may contain recommended sub-groups, e.g., sub-groups 432, 434, and 436. For example, group 430 may be a human resources group, sub-group 432 may be an HR Chicago sub-group, sub-group 434 may be an HR Los Angeles sub-group, and sub-group 436 may be an HR New York sub-group. Users in sub-groups 432, 434, and 436 may be members of group 430. A user who is the human resources manager may be a member of sub-groups 432, 434, and 436.

Cluster graph 450 depicts clustering of a plurality of files. Each data point on cluster graph 450 may represent an individual file. The location of the files in the cluster graph 450 may depend upon file metadata information from the file table 330, including filenames, file types, creation date, last access date, last modification date, parent folder, file size, or file contents. The location of the files in the cluster graph 450 may depend upon information from the permissions table 340, including what permissions users have for the files. The location of the files in the cluster graph 450 may also depend upon information from the DFS log data 350, including which users have accessed the files, what type of access, etc.

As the machine learning operation module 170 is trained, different weights may be applied to different features of the file data. For example, the parent folder may be weighted more heavily than the file size.

The machine learning operation module 170 may calculate file similarity scores to quantify the similarity of a file to other files. Euclidean distance, cosine distance, or other techniques may be used to measure similarity. A plurality of files having file similarity scores above a specified threshold may be labeled by the machine learning operation module 170 and grouped together into recommended folders, such as folders 460, 470, and 480. A file having insufficient similarity to other files, e.g., file 452, may be an outlier that is not included in a recommended folder. Such an outlier file may be flagged and brought to the administrator's attention. Recommended folder membership may be based, in whole or in part, by the shared drives or folders in the existing DFS.

A recommended folder, e.g., folder 480, may contain recommended sub-folders, e.g., sub-folders 482, 484, and 486. For example, folder 480 may be a payroll folder, sub-folder 482 may be a Chicago payroll sub-folder, sub-folder 484 may be a Los Angeles payroll sub-folder, and sub-folder 486 may be a New York sub-folder. Files in sub-folder 482, 484, and 486 may be members of parent folder 480.

The arrows from the cluster graph 400 to the cluster graph 450 represent recommended permissions. Recommended permissions may be assigned to a recommended group, recommended sub-group, or user. Recommended permissions may apply to a recommended folder, recommended sub-folder, or file. Recommended permissions may specify a level of access, such as full control, change, or read-only. As illustrated, group 410 has access to folder 460, group 420 has access to folder 470, sub-group 432 has access to sub-folder 482, sub-group 434 has access to sub-folder 484, and sub-group 436 has access to sub-folder 486.

The recommended permissions may depend upon information from the permissions table 340, including which groups or users have which level of access to which shared drives, folders, or files. The recommended permissions may depend upon information from the DFS log data 350, including which users have accessed the files, what type of access, when the access occurred, etc.

The machine learning operation module 170 may store information about the recommended groups, folders, and permissions in the database 180.

Exemplary Indication of Recommended Groups, Folders, and Permissions

FIGS. 5A-5D depict exemplary indications of recommended groups, folders, and permissions for review, according to some aspects. Indications of recommended groups, folders, and permissions may be generated by visualization and customization module 174 from the recommended groups, folders, and permissions stored in the database 180. The client device 108 may access the indications of recommended groups, folders, and permissions from the migration assessment server 104 or the migration assessment server 104 may transmit the indications of recommended groups, folders, and permissions to the client device 108. The indications of recommended groups, folders, and permissions may be embodied in a web page, application, or other suitable interface format.

FIG. 5A depicts an exemplary indication of recommended groups, folders, and permissions for a user. In one aspect, user recommendation interface 500 may be customized for each user. The user recommendation interface 500 may include group membership information 502. The group membership information 502 may indicate one or more recommended groups for which the user will be a member. The group membership information 502 may be a static list or an interactive tree structure that displays group and sub-group structure. The group membership information 502 may indicate other members that are members of the recommended groups. In the illustrated example, user Thomas Quincy, who is a Payroll Coordinator in the Chicago office, will be a member of the Employees group, the Human Resources group, and the HR Chicago sub-group.

In one aspect, the user recommendation interface 500 may include access information 504. The access information 504 may indicate which folders or files the user may access. The access information 504 may indicate which group was granted access to the folder or file or if access was granted to the user specifically. The access information 504 may indicate what level of access the user has for the folders and files. The folders and files may have been accessible previously or newly granted. The access information 504 may be a static list or an interactive tree structure that displays folder, sub-folder, and file structure. The access information 504 may include information about the previous shared drive or folder membership from the existing DFS. In the illustrated example, the user will have access to the General and Payroll Chicago folders. Within the Payroll Chicago folder are a plurality of Chicago payroll spreadsheets.

In one aspect, the user recommendation interface 500 may include revoked access information 506. The revoked access information 506 may indicate which folders or files for which the user will no longer have access. The revoked access information 506 may be a static list or an interactive tree structure that displays folder, sub-folder, and file structure. The revoked access information 506 may include information about the shared drive or folder membership from the existing DFS. The revoked access information 506 may include information about why access revocation is being recommended. In the illustrated example, the user will no longer have access to Los Angeles and New York payroll spreadsheets, which are now located in a Payroll Los Angeles and a Payroll New York folder, respectively.

In one aspect, the user recommendation interface 500 may include file search 508, which allows users to search for where their files will be located in the new DFS. File search 508 may comprise a text input that permits the user to enter one or more keywords to search. The file name and path may be outputted in the file search 508 or displayed in the access information 504 or revoked access information 506.

In one aspect, the user recommendation interface 500 may include feedback input 510. The feedback input 510 may allow the user to provide feedback on the recommendations. The feedback input 510 may allow freeform text or another form of input. The visualization and customization module 174 may collect, consolidate, and present user feedback to an administrator.

Figure 5B:
FIG. 5B depicts an exemplary indication of the recommended users and groups in the new DFS for review by an administrator, according to some aspects.

FIG. 5B-5D depicts an exemplary indication of recommended groups, folders, and permissions for an administrator. The administrator may review and edit the recommended groups, folders, and permissions. The edits may be accessed by the machine learning training module 168 to train or fine tune the machine learning operation module 170.

FIG. 5B depicts user and group administration interface 520. In one aspect, the user and group administration interface 520 may include recommended groups and users 522. The recommended groups and users 522 may display one or more recommended groups, sub-groups, or users. The recommended groups and users 522 may include a prior group name from the existing DFS or may indicate that the group is new. In the illustrated example, the recommended Employees group may correspond to the Everyone group from the existing DFS. The recommended groups and users 522 may be a static list or an interactive tree structure that displays group and sub-group structure.

In one aspect, the user and group administration interface 520 may include deleted groups and users 524. The deleted groups and users 524 may indicate recommendations generated by the machine learning operation module 170 or rules evaluation module 172 for which groups and users should not be migrated to the new DFS. In the illustrated example, the user pcarroll is recommended to be deleted because he has not logged in in the past three months.

In one aspect, the user and group administration interface 520 may include user or group search 526, which allows the administrator to search for users or groups in the new DFS. User or group search 526 may comprise a text input that permits the administrator to enter one or more keywords to search. The user or group information may be outputted in the user or group search 526 or displayed in the recommended groups and users 522 or deleted groups and users 524.

FIG. 5C depicts file and folder administration interface 530. In one aspect, the file and folder administration interface 530 may include recommended folders and files 532. The recommended folders and files 532 may display one or more recommended folders, sub-folders, or files. The recommended folders and files 532 may include a prior folder name or shared drive name from the existing DFS or may indicate that the folder is new. In the illustrated example, the recommended Accounting folder may correspond to the E:\ shared drive from the existing DFS. The recommended folders and files 532 may be a static list or an interactive tree structure that displays folder and sub-folder structure.

In one aspect, the file and folder administration interface 530 may include deleted folders and files 534. The deleted folders and files 534 may indicate recommendations generated by the machine learning operation module 170 or rules evaluation module 172 for which folders or files should not be migrated to the new DFS. In the illustrated example, the file New York payroll 8-2019.xlsx is recommended to be deleted because it has not been accessed in in the past three years.

In one aspect, the file and folder administration interface 530 may include file or folder search 536, which allows the administrator to search for files or folders in the new DFS. File or folder search 536 may comprise a text input that permits the administrator to enter one or more keywords to search. The file or folder information may be outputted in the file or folder search 536 or displayed in the recommended folders and files 532 or deleted folders and files 534.

FIG. 5D depicts permissions administration interface 540. In one aspect, the permissions administration interface 540 may include group tree 542. The group tree 542 is organized by group. For each group, the folders or files accessible by the group are displayed. In the illustrated example, the HR Chicago group has access to the Payroll\Chicago folder.

In one aspect, the permissions administration interface 540 may include folder tree 544. The folder tree 544 is organized by folder. For each folder, the groups or users who have access to the folder are displayed. In the illustrated example, the Engineering group has access to the Product Data folder.

In one aspect, the permissions administration interface 540 may display new permissions that are not present in the existing DFS. The permissions administration interface 540 may display revoked permissions that are present in the existing DFS but recommended to be deleted.

Exemplary Method of Distributed File System Migration Mapping

Figure 6:
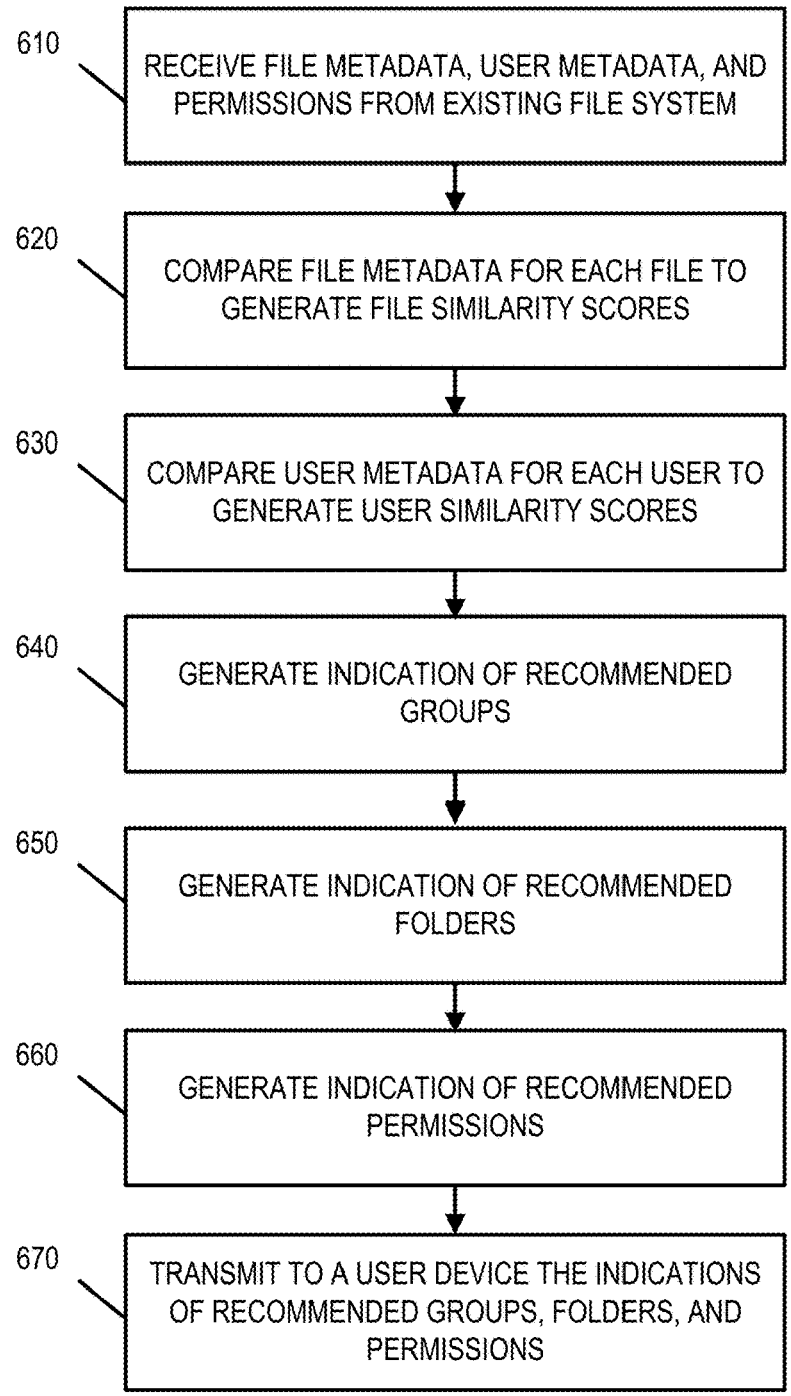
FIG. 6 depicts an exemplary flow diagram of a method for performing DFS migration mapping, according to some aspects.

FIG. 6 depicts a flow diagram of an exemplary computer-implemented method 600 for DFS migration mapping. One or more steps of the computer-implemented method 600 may be implemented as a set of instructions stored on a computer-readable memory and executable on one or more processors. The computer-implemented method 600 of FIG. 6 may be implemented via a system, such as the DFS server 102, the migration assessment server 104, the client device 108, and/or the cloud DFS 122. The computer-implemented method 600 may operate in conjunction with the scenarios and/or environments illustrated in FIGS. 1-5D and/or in other environments.

In one aspect, the computer-implemented method 600 may include training, a machine learning (ML) model with a training dataset to generate a trained ML model. In one aspect, the computer-implemented method 600 may include validating, with the one or more processors, the trained ML model with a validation dataset. The training dataset may comprise labeled file metadata comprising specified folders, labeled user metadata comprising specified groups, and specified permissions. The validation dataset may comprise unlabeled file metadata and unlabeled user metadata. The training and validating may be performed by the machine learning training module 168. The ML model and the trained ML model may be the machine learning operation module 170.

In one aspect, the computer-implemented method 600 may include at block 610 receiving file metadata for a plurality of files, user metadata for a plurality of users, and permissions from an existing DFS. The permissions may comprise rules regarding access rights of the plurality of users to the plurality of files. The file metadata, user metadata, and permissions may be received by the source environment discovery and export module 166.

In one aspect, the computer-implemented method 600 may include at block 620 comparing the file metadata for each file to generate file similarity scores. The method may also include comparing activity log entries for each file to generate file similarity scores. The activity log may comprise a record of which users accessed which files. The file similarity scores may identify a degree of similarity between compared files. The comparison of file metadata may be performed by the machine learning operation module 170.

In one aspect, the computer-implemented method 600 may include at block 630 comparing the user metadata for each user to generate user similarity scores. The method may also include comparing activity log entries for each user to generate user similarity scores. The activity log may comprise a record of which users accessed which files. The user similarity scores identify a degree of similarity between compared users. The comparison of user metadata may be performed by the machine learning operation module 170.

In one aspect, the computer-implemented method 600 may include at block 640 generating an indication of recommended groups comprising a plurality of users having user similarity scores that exceed a specified threshold. An administrator may specify the threshold. Generating the indication of recommended groups may be performed by the machine learning operation module 170 and rules evaluation module 172.

In one aspect, the computer-implemented method 600 may include at block 650 generating an indication of recommended folders comprising a plurality of files having file similarity scores that exceed a specified threshold. An administrator may specify the threshold. Generating the indication of recommended folders may be performed by the machine learning operation module 170 and rules evaluation module 172.

In one aspect, the computer-implemented method 600 may include at block 660 generating an indication of recommended permissions comprising access rights of the recommended groups to the recommended folders. Generating the indication of recommended permissions may be performed by the machine learning operation module 170 and rules evaluation module 172.

In one aspect, the computer-implemented method 600 may include at block 670 transmitting to a user device the indication of the recommended groups, the indication of the recommended folders, and the indication of the recommended permissions for presentation to a user associated with the user device. Transmitting to a user device may be performed by the visualization and customization module 174.

In one aspect, the computer-implemented method 600 may include receiving feedback from the user regarding the indication of the recommended groups, the indication of the recommended folders, or the indication of the recommended permissions. In one aspect, the computer-implemented method 600 may include presenting the feedback to an administrator associated with the migration. Receiving and presenting the feedback may be performed by the visualization and customization module 174.

In one aspect, the computer-implemented method 600 may include flagging one or more of the files for manual review. The flagging the one or more files may comprise detecting abnormal permissions, sensitive content, or stale content associated with the one or more files. Flagging may be performed by the rules evaluation module 172. In one aspect, the computer-implemented method 600 may include presenting the one or more flagged files to an administrator associated with the migration. Presenting may be performed by the visualization and customization module 174.

In one aspect, the computer-implemented method 600 may include flagging one or more of the users for manual review. The flagging the one or more users may comprise detecting abnormal permissions or a specified period of inactivity associated with the one or more users. Flagging may be performed by the rules evaluation module 172. In one aspect, the computer-implemented method 600 may include presenting the one or more flagged users to an administrator associated with the migration. Presenting may be performed by the visualization and customization module 174.

In one aspect, the computer-implemented method 600 may include generating groups in the new DFS based upon the indication of the recommended groups. In one aspect, the computer-implemented method 600 may include generating folders in the new DFS based upon the indication of the recommended folders. In one aspect, the computer-implemented method 600 may include generating permissions in the new DFS based upon the indication of the recommended permissions. In one aspect, the computer-implemented method 600 may include migrating the plurality of users from the existing DFS to the groups in the new DFS. In one aspect, the computer-implemented method 600 may include migrating the plurality of files from the existing DFS to the folders in the new DFS. Generating groups, folders, and permissions and migrating users and files may be performed by the migration module 176. The new DFS may comprise a cloud-based system.

It should be understood that not all blocks of the computer-implemented method 600 are required to be performed. Moreover, the computer-implemented method 600 is not mutually exclusive (i.e., block(s) from computer-implemented method 600 may be performed in any particular implementation).

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term 'XYZ' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, which is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the aspects herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of mapping a migration to a new distributed file system (DFS), the method comprising:
   receiving, with one or more processors, file metadata for a plurality of files, user metadata for a plurality of users, and permissions from an existing DFS, wherein the permissions comprise rules regarding access rights of the plurality of users to the plurality of files;
   comparing, with the one or more processors, the file metadata for each file to generate file similarity scores, wherein the file similarity scores identify a degree of similarity between compared files;
   comparing, with the one or more processors, the user metadata for each user to generate user similarity scores, wherein the user similarity scores identify a degree of similarity between compared users;
   generating, with the one or more processors, an indication of recommended groups comprising a plurality of users having user similarity scores that exceed a specified threshold;
   generating, with the one or more processors, an indication of recommended folders comprising a plurality of files having file similarity scores that exceed a specified threshold;
   generating, with the one or more processors, an indication of recommended permissions comprising access rights of the recommended groups to the recommended folders; and
   transmitting to a user device, with the one or more processors, the indication of the recommended groups, the indication of the recommended folders, and the indication of the recommended permissions for presentation to a user associated with the user device.

2. The computer-implemented method of claim 1, further comprising:
   receiving, with the one or more processors, feedback from the user regarding the indication of the recommended groups, the indication of the recommended folders, or the indication of the recommended permissions; and
   presenting, with the one or more processors, the feedback to an administrator associated with the migration.

3. The computer-implemented method of claim 1, further comprising:
   generating, with the one or more processors, groups in the new DFS based upon the indication of the recommended groups;
   generating, with the one or more processors, folders in the new DFS based upon the indication of the recommended folders;
   generating, with the one or more processors, permissions in the new DFS based upon the indication of the recommended permissions;
   migrating, with the one or more processors, the plurality of users from the existing DFS to the groups in the new DFS; and
   migrating, with the one or more processors, the plurality of files from the existing DFS to the folders in the new DFS.

4. The computer-implemented method of claim 3, wherein the new DFS comprises a cloud-based system.

5. The computer-implemented method of claim 1, further comprising:
   training, with the one or more processors, a machine learning (ML) model with a training dataset to generate a trained ML model; and
   validating, with the one or more processors, the trained ML model with a validation dataset,
   wherein the training dataset comprises labeled file metadata comprising specified folders, labeled user metadata comprising specified groups, and specified permissions, and the validation dataset comprises unlabeled file metadata and unlabeled user metadata,
   wherein the comparing the file metadata for each file to generate file similarity scores and the comparing the user metadata for each user to generate user similarity scores are performed by the trained ML model,
   wherein the generating the indication of the recommended groups, the generating the indication of the recommended folders, and the generating the indication of recommended permissions are performed by the trained ML model.

6. The computer-implemented method of claim 1, further comprising:
   flagging, with the one or more processors, one or more of the files for manual review, wherein the flagging the one or more files comprises detecting, with the one or more processors, abnormal permissions, sensitive content, or stale content associated with the one or more files; and
   presenting, with the one or more processors, the one or more flagged files to an administrator associated with the migration.

7. The computer-implemented method of claim 1, further comprising:
   flagging, with the one or more processors, one or more of the users for manual review, wherein the flagging the one or more users comprises detecting, with the one or more processors, abnormal permissions or a specified period of inactivity associated with the one or more users; and presenting, with the one or more processors, the one or more flagged users to an administrator associated with the migration.

8. The computer-implemented method of claim 1,
wherein the comparing the file metadata for each file to generate file similarity scores further comprises comparing activity log entries for each file,
wherein the comparing the user metadata for each user to generate user similarity scores further comprises comparing activity log entries for each user,
wherein the activity log comprises records of the users accessing the files.

9. A computer system for mapping a migration to a new distributed file system (DFS), the computer system comprising:
one or more processors; and
one or more memories having stored thereon computer-executable instructions that, when executed, cause the system to:
receive file metadata for a plurality of files, user metadata for a plurality of users, and permissions from an existing DFS, wherein the permissions comprise rules regarding access rights of the plurality of users to the plurality of files;
compare the file metadata for each file to generate file similarity scores, wherein the file similarity scores identify a degree of similarity between compared files;
compare the user metadata for each user to generate user similarity scores, wherein the user similarity scores identify a degree of similarity between compared users;
generate an indication of recommended groups comprising a plurality of users having user similarity scores that exceed a specified threshold;
generate an indication of recommended folders comprising a plurality of files having file similarity scores that exceed a specified threshold;
generate an indication of recommended permissions comprising access rights of the recommended groups to the recommended folders; and
transmit to a user device the indication of the recommended groups, the indication of the recommended folders, and the recommended permissions for presentation to a user associated with the user device.

10. The computer system of claim 9, the one or more memories having stored thereon instructions that, when executed, cause the system to:
receive feedback from the user regarding the indication of the recommended groups, the indication of the recommended folders, or the indication of the recommended permissions; and
present the feedback to an administrator associated with the migration.

11. The computer system of claim 9, the one or more memories having stored thereon instructions that, when executed, cause the system to:
generate groups in the new DFS based upon the indication of the recommended groups;
generate folders in the new DFS based upon the indication of the recommended folders;
generate permissions in the new DFS based upon the indication of the recommended permissions;
migrate the plurality of users from the existing DFS to the groups in the new DFS; and
migrate the plurality of files from the existing DFS to the folders in the new DFS.

12. The computer system of claim 9, wherein the new DFS comprises a cloud-based system.

13. The computer system of claim 9, the one or more memories having stored thereon instructions that, when executed, cause the system to:
train a machine learning (ML) model with a training dataset to generate a trained ML model; and
validate the trained ML model with a validation dataset,
wherein the training dataset comprises labeled file metadata comprising specified folders, labeled user metadata comprising specified groups, and specified permissions, and the validation dataset comprises unlabeled file metadata and unlabeled user metadata,
wherein the comparing the file metadata for each file to generate file similarity scores and the comparing the user metadata for each user to generate user similarity scores are performed by the trained ML model,
wherein the generating the indication of the recommended groups, the generating the indication of the recommended folders, and the generating the indication of the recommended permissions are performed by the trained ML model.

14. The computer system of claim 9, the one or more memories having stored thereon instructions that, when executed, cause the system to:
flag one or more of the files for manual review, wherein the flagging the one or more files comprises detecting abnormal permissions, sensitive content, or stale content associated with the one or more files; and
present the one or more flagged files to an administrator associated with the migration.

15. The computer system of claim 9, the one or more memories having stored thereon instructions that, when executed, cause the system to:
flag one or more of the users for manual review, wherein the flagging the one or more users comprises detecting abnormal permissions or a specified period of inactivity associated with the one or more users; and
present the one or more flagged users to an administrator associated with the migration.

16. The computer system of claim 9,
wherein the comparing the file metadata for each file to generate file similarity scores further comprises comparing activity log entries for each file,
wherein the comparing the user metadata for each user to generate user similarity scores further comprises comparing activity log entries for each user,
wherein the activity log comprises records of the users accessing the files.

17. A computer readable storage medium having stored thereon non-transitory computer readable instructions that when executed, cause a computer to:
receive file metadata for a plurality of files, user metadata for a plurality of users, and permissions from an existing distributed file system (DFS), wherein the permissions comprise rules regarding access rights of the plurality of users to the plurality of files;
compare the file metadata for each file to generate file similarity scores, wherein the file similarity scores identify a degree of similarity between compared files;
compare the user metadata for each user to generate user similarity scores, wherein the user similarity scores identify a degree of similarity between compared users;

generate an indication of recommended groups comprising a plurality of users having user similarity scores that exceed a specified threshold;

generate an indication of recommended folders comprising a plurality of files having file similarity scores that exceed a specified threshold;

generate an indication of recommended permissions comprising access rights of the recommended groups to the recommended folders; and transmit to a user device the indication of the recommended groups, the indication of the recommended folders, and the indication of the recommended permissions for presentation to a user associated with the user device.

18. The computer readable storage medium of claim 17, comprising instructions that, when executed by the one or more processors, cause the one or more processors to:

receive feedback from the user regarding the indication of the recommended groups, the indication of the recommended folders, or the indication of the recommended permissions; and present the feedback to an administrator associated with the migration.

19. The computer readable storage medium of claim 17, comprising instructions that, when executed by the one or more processors, cause the one or more processors to:

generate groups in the new DFS based upon the indication of the recommended groups;

generate folders in the new DFS based upon the indication of the recommended folders;

generate permissions in the new DFS based upon the indication of the recommended permissions;

migrate the plurality of users from the existing DFS to the groups in the new DFS; and migrate the plurality of files from the existing DFS to the folders in the new DFS.

20. The computer readable storage medium of claim 17, wherein the new DFS comprises a cloud-based system.

21. The computer readable storage medium of claim 17, comprising instructions that, when executed by the one or more processors, cause the one or more processors to:

train a machine learning (ML) model with a training dataset to generate a trained ML model; and validate the trained ML model with a validation dataset, wherein the training dataset comprises labeled file metadata comprising specified folders, labeled user metadata comprising specified groups, and specified permissions, and the validation dataset comprises unlabeled file metadata and unlabeled user metadata, wherein the comparing the file metadata for each file to generate file similarity scores and the comparing the user metadata for each user to generate user similarity scores are performed by the trained ML model, wherein the generating the indication of the recommended groups, the generating the indication of the recommended folders, and the generating the indication of the recommended permissions are performed by the trained ML model.

22. The computer readable storage medium of claim 21, comprising instructions that, when executed by the one or more processors, cause the one or more processors to:

flag one or more of the files for manual review, wherein the flagging the one or more files comprises detecting abnormal permissions, sensitive content, or stale content associated with the one or more files; and present the one or more flagged files to an administrator associated with the migration.

23. The computer readable storage medium of claim 21, comprising instructions that, when executed by the one or more processors, cause the one or more processors to:

flag one or more of the users for manual review, wherein the flagging the one or more users comprises detecting abnormal permissions or a specified period of inactivity associated with the one or more users; and present the one or more flagged users to an administrator associated with the migration.

24. The computer readable storage medium of claim 21, wherein the comparing the file metadata for each file to generate file similarity scores further comprises comparing activity log entries for each file, wherein the comparing the user metadata for each user to generate user similarity scores further comprises comparing activity log entries for each user, wherein the activity log comprises records of the users accessing the files.

* * * * *